(No Model.)
R. PLECHNER.
PROCESS OF PRODUCING ELASTIC FABRICS.
No. 554,535. Patented Feb. 11, 1896.
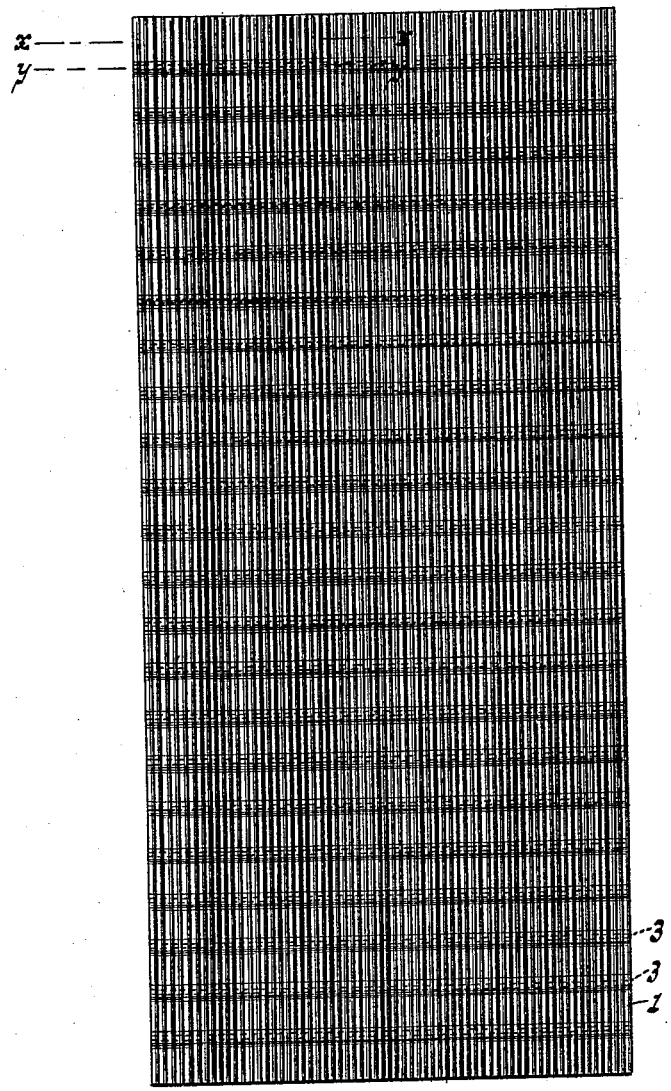
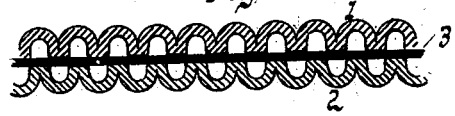
WITNESSES:
William M. Miller
Chas. E. Gveurgend.
INVENTOR
Richard Plechner.
BY Hauff & Hauff
ATTORNEY

UNITED STATES PATENT OFFICE.

RICHARD PLECHNER, OF NEW YORK, N. Y.

PROCESS OF PRODUCING ELASTIC FABRICS.

SPECIFICATION forming part of Letters Patent No. 554,535, dated February 11, 1896.

Application filed September 19, 1895. Serial No. 563,036. (No specimens.)

*To all whom it may concern:*

Be it known that I, RICHARD PLECHNER, a citizen of the United States, residing at New York, in the county and State of New York, have invented new and useful Improvements in Processes of Producing Elastic Fabrics, of which the following is a specification.

This invention has for its object to provide a new and improved process or method of manufacturing or producing crimped elastic fabrics; and it consists in the order of procedure and steps hereinafter described and specifically pointed out in the claim, reference being made to the accompanying drawings, in which—

Figure 1 is a plan view of the fabric. Fig. 2 is a section along $xx$, Fig. 1. Fig. 3 is a section along $yy$, Fig. 1.

The fabric consists of two plies or layers of material 1 and 2. The material may be any suitable flexible fabric, woven or otherwise—such as cloth, leather, or other substance. The plies or pieces 1 and 2 are cemented or caused to adhere together, elastic strips or cords 3 being interposed before cementing, after which the completed structure is crimped. A ply or piece of fabric 1 is laid out flat and the pieces of elastic 3 are laid on the fabric at suitable distances apart. A cement is then applied to the ply or piece 1. This cement or adhesive may be any suitable kind, either solid or liquid. The well-known rubber cement or sheets or films of gutta-percha I have found give satisfactory results. It may be noted that the cement or adhesive may be applied either before or after the elastics are put in place. A piece or ply of material 2 being applied to the piece 1 is caused to adhere thereto by the cement. The structure thus built up is then crimped in any suitable well-known way—as, for example, by passing the same through hot crimping-rollers.

If cement sheets are used the heated crimping-rollers also aid in bringing into action the adhesive property of the cement.

The piece or ply 1 may be the same kind as the piece 2, or it may be some other kind, according to the finish or facing desired. In some cases, for example, one of the pieces 1 and 2 is silk or textile fabric while the other piece is leather, or both pieces 1 and 2 may be leather, or both silk or textile fabric or other material.

The textile fabric can be used for various purposes—as, for example, in the manufacture of corsets, belts, satchels, pocket-books, and other objects where elastic fabrics are requisite or serviceable.

What I claim as new, and desire to secure by Letters Patent, is—

The process of producing a textile fabric which consists in spreading out a ply or piece of fabric in a flat condition, applying to said piece a cement or adhesive, applying a second ply or piece to the first-named ply or piece so as to cause the two to adhere, and then crimping the plies, suitable elastics in unstretched condition having been interposed between the plies prior to their being secured or cemented together substantially as described.

In testimony whereof I have hereunto set my hand in the presence of two subscribing witnesses.

RICHARD PLECHNER.

Witnesses:
WM. C. HAUFF,
E. F. KASTENHUBER.